United States Patent [19]

Schlapp

[11] 3,948,119
[45] Apr. 6, 1976

[54] DEVICE FOR LIMITING THE NUMBER OF REVOLUTIONS OF A SHAFT OR THE LIKE, ESPECIALLY FOR SLIDING ROOF DRIVES IN AUTOMOBILES

[75] Inventor: Albert Schlapp, Sprendlingen, Germany

[73] Assignee: Rockwell-Golde G.m.b.H., Frankfurt, Germany

[22] Filed: June 20, 1974

[21] Appl. No.: 481,182

[30] Foreign Application Priority Data
July 2, 1973 Germany............................ 2333666

[52] U.S. Cl....................... 74/805; 49/35; 192/67 R
[51] Int. Cl.²........................................... F16H 1/28
[58] Field of Search ............ 49/209, 210, 260, 352, 49/350; 74/72, 805; 192/67 R

[56] References Cited
UNITED STATES PATENTS

| | | | |
|---|---|---|---|
| 2,180,597 | 11/1939 | Le Bus............................. | 192/67 R |
| 2,370,872 | 3/1945 | Miller et al. ..................... | 74/805 |
| 2,370,992 | 3/1945 | Perry et al. ..................... | 74/805 |
| 2,864,267 | 12/1958 | Merriman et al. ................ | 74/805 |
| 2,900,183 | 8/1959 | Leslie et al. ..................... | 49/35 |
| 3,104,850 | 9/1963 | Wood............................... | 192/67 R |
| 3,159,392 | 12/1964 | Pollak.............................. | 49/35 |
| 3,171,644 | 3/1965 | Griswold, Jr...................... | 49/35 |
| 3,224,398 | 12/1965 | Greulich ......................... | 192/67 R |
| 3,398,486 | 8/1968 | Cadiou............................. | 49/209 |

*Primary Examiner*—Samuel Scott
*Assistant Examiner*—Wesley S. Ratliff, Jr.

[57] ABSTRACT

The invention relates to a device for limiting the number of revolutions of a shaft or the like, especially for the rotatable drive of sliding roofs in automobiles, which comprises an eccentric disc securely mounted on the shaft and having an externally toothed ring rotatably mounted on its circumferential surface, which ring is surrounded by an inner toothed arrangement situated fixed in a rosette block concentric to the shaft axis, the tooth root radius of which exceeds, by approximately the eccentricity of the eccentric disc, the tooth tip radius of the toothed ring, whereby abutment means for the end limiting positions of the shaft after a predetermined number of rotations has been reached are connected to on the one hand the tooth ring and on the other hand the rosette block.

7 Claims, 12 Drawing Figures

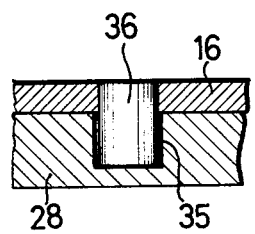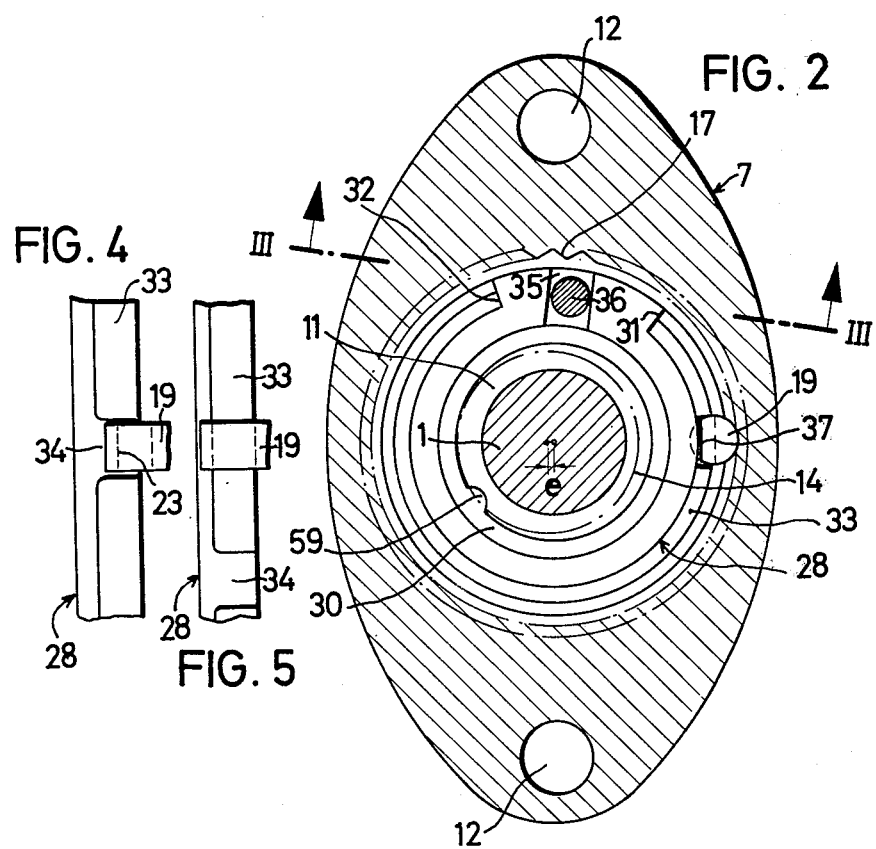

DEVICE FOR LIMITING THE NUMBER OF REVOLUTIONS OF A SHAFT OR THE LIKE, ESPECIALLY FOR SLIDING ROOF DRIVES IN AUTOMOBILES

BACKGROUND OF THE INVENTION

A device of this class is already known. This known device has proved eminently suitable for the drive of sliding roofs of automobiles, because it requires only a limited complication of construction means to achieve a reliable limitation of revolutions, and can be housed without additional space demand in the rosette which usually surrounds the shaft head. In this known device, the limitation of the number of revolutions serves for limiting the distance of slide of the roof.

In a more modern sliding roof design the sliding roof can either be moved out in the manner of a front hinged ventilator flap by raising its rear edge, or can be slid beneath the rear roof surface, as desired. In this form of sliding roof design, the aim is so to construct the drive that it is capable of producing both the lifting out function and also the sliding function. Thus, only one operating element, for example the hand crank in the case of a hand drive, is provided for both drive functions.

In this known form of construction of a sliding roof, the device for revolutions limitation must be so constructed that it provides a limitation of revolutions both for the sliding movement and also for the lifting out movement. In general terms, the limitation device must be capable of limiting the number of revolutions of a shaft for two different movement sequences, which are however effected by the same shaft.

In a known device of the category initially described, this requirement is met in that the abutment means of the rosette block are disposed upon a slider which is mounted in the rosette block so as to be transversely adjustable to the shaft and in that they can be switched as desired into the movement path of the abutment means mounted on the ring. This known and constructionally very simple device has demonstrated its excellent functional capability in practice. In order to make the limitation of revolutions effective for the two different movement sequences, two switching positions for the slider are however necessary in this known device, which however makes the device more difficult to operate. With the known device, the operating person must note the relevant direction of rotation and the corresponding switching position, in order to produce the desired movement sequence.

The objective underlying the present invention is to simplify the operating of the device constructed for two different movement sequences to be effected by the same shaft, and especially to eliminate the need for two switching positions for the two different movement sequences.

SUMMARY OF THE INVENTION

The stated problem is solved in a device starting from the category initially named in that, the abutment means connected to the rosette block is a locking pin slidably guided parallel to the shaft, which can be engaged into or disengaged from the path of the abutment means connected to the toothed ring only in a specific setting of the toothed ring, whereby, in the engaged position, it permits both directions of rotation of the drive and, in its disengaged position, the drive is blocked in both directions of rotation. In the device according to the invention, starting from the zero setting which is the only setting in which the locking pin can be actuated, it is only necessary at the commencement of one of the two movement sequences or when changing over from one movement sequence to the other, which in the preferred method of application may for example be transition from the sliding motion after the roof has been closed to the lifting out motion, for the locking pin to be introduced into the path of the abutment means connected to the toothed ring, in order to release the blocking of rotational movement.

In an advantageous form of embodiment of the device according to the invention, the arrangement is such that the abutment means connected to the toothed ring are constructed as peripheral steps on a locking ring, which is rotatably mounted concentric to the shaft in the rosette block and is provided with a radial groove, into which a driver pin secured to the toothed ring engages, in that the locking ring is equipped between the peripheral steps with an annular shoulder interrupted at a specified position to permit passage of the locking pin, and in that the locking pin fitted with an anti-torsion device possesses a transverse recess for engagement with the annular shoulder. In this form of embodiment, the locking ring fulfills two functions, in that in the first place it carries the travel-limiting abutment means and in the second place it securely holds, by means of its annular shoulder, the engaged locking pin, so that the drive can be actuated in both rotational directions.

The locking pin is with advantage so arranged that it is slidable in a guide sleeve secured to the rosette block, which sleeve possesses a cylindrical passage bounded at the end remote from the rosette block by an annular projection, in which passage there is situated a helical compression spring surrounding the locking pin, and bearing on the one hand against the rosette block and on the other hand against a flange of the locking pin with prestress, whereby the sliding travel of the flange in the cylindrical passage is limited by the annular projection in one direction, and in that the locking pin, in its disengaged setting in which the flange and annular projection bear onto one another, is on the one hand out of engagement at its transverse recess with the annular shoulder and on the one hand out of engagement at its transverse recess with the annular shoulder and on the other hand projects beyond the guide sleeve and engages into the hand crank which is non-rotationally keyed in known manner onto the shaft. In this manner, assurance is also provided that the locking pin, when the zero setting is reached, is automatically disengaged, i.e., by the force of the helical compression spring, and blocks the drive in both rotational directions.

In a further embodiment of the concept of the invention, the arrangement is such that, at the position of the engagement between the locking pin and the hand crank, a catch sleeve is introduced into the hand crank, which catch sleeve journals in its cylindrical passage a catch bolt which can slide between two positions, and such that this cylindrical passage is engaged by a spring which is associated with arrestor recesses on the catch bolt corresponding to the two positions, such that the end of the catch bolt adjacent to the rosette block engages, in one of the positions, in the guide sleeve and, in the other position which is the rest position, releases the guide sleeve, whereby the guide sleeve is fitted at its end nearest to the catch bolt with oblique disengagement surfaces acting in both shaft directions of rotation, which when the shaft rotates release the engagement between the catch bolt and the guide sleeve and move the catch bolt into its rest position, and such that the catch bolt, in its engagement position with the guide sleeve, is held by its spring against the force of the helical compression spring. The catch bolt consequently co-operates with the locking pin, care being taken to ensure that on the one hand the catch bolt can hold the locking pin against the force of the helical compression spring in the engaged position, until the annular shoulder engages into the transverse recess of the locking pin, and that on the other hand the catch bolt, after the locking pin has been actuated, returns into its rest position when the hand crank is rotated.

It is of advantage in the forming of the guide sleeve if this guide sleeve is furnished, radially opposite to its oblique disengaging surfaces, with external oblique ejection surfaces acting in both directions of rotation, which push the catch bolt into its rest position. In this way, ensurance is provided that if the catch bolt is pushed in as a result of faulty actuation, it will be pushed back again into its rest position when the hand crank is turned, as it unavoidably rides up on the guide sleeve.

BRIEF DESCRIPTION OF THE DRAWINGS

FIG. 2. A section along the line II—II in FIG. 1,

FIG. 3. A cut-away section along the line III—III of FIG. 2 through the toothed ring and locking ring in the region of the driver engagement.

FIGS. 4 and 5. Cut-away lateral views of the locking ring with the locking pin extended and withdrawn respectively, FIG. 6. The locking ring in perspective, FIG. 7. The catch sleeve in perspective, FIG. 8. The spring associated with the catch sleeve, also in perspective, FIG. 9. A cut-away section similar to FIG. 1, in which the locking pin is in its engaged position, while the catch bolt is shown in its rest position, FIG. 10. A section similar to FIG. 9, but with the catch bolt pushed in, and FIG. 11. A cut-away section along the line XI—XI of FIG. 10.

DESCRIPTION OF THE PREFERRED EMBODIMENT

Figure 1:
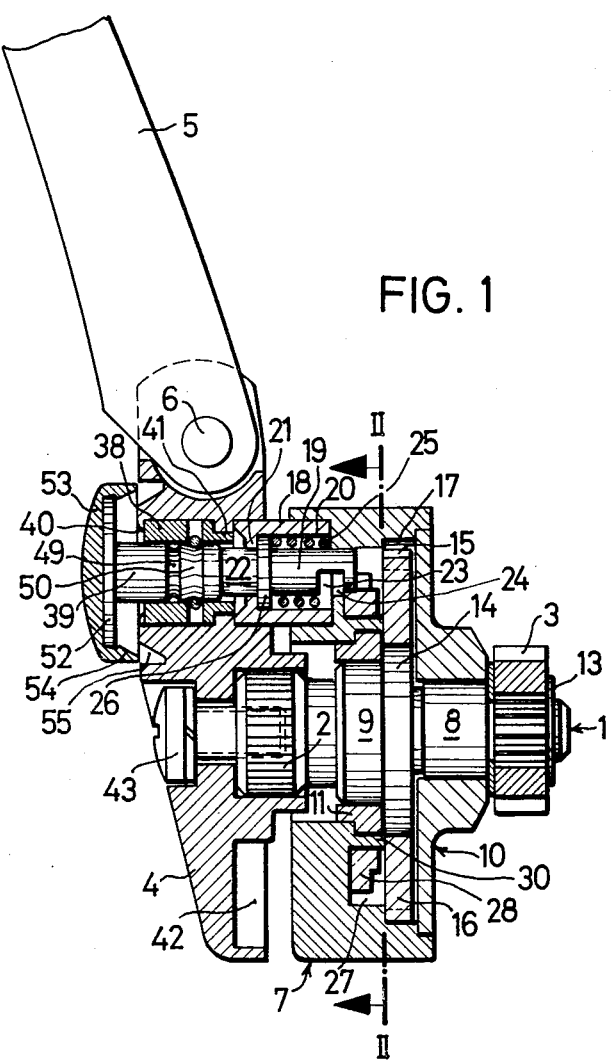
FIG. 1. A section, enlarged for clarity, through the device of this invention constructed for hand crank operation.

The shaft 1 is fitted at one end with a splined head 2 and at the other end with a rotationally keyed drive pinion 3, which engages in known manner two threaded cables, one on each side, to actuate the sliding roof. The hand crank, pushed onto the splined head 2 with a corresponding internal splining is composed, in the example shown, of a crank foot 4 and a crank arm 5, shown cut-away. The crank foot 4 and the crank arm 5 are pivotally connected together by a pivot pin 6. A more detailed representation and description of the cable drive for sliding roofs according to the state-of-the-art is unnecessary, because the present invention does not relate to this. The shaft 1, passing through the rosette block 7, is journalled in regions 8 and 9 respectively in a bearing lid 10 and in a bearing ring 11 inserted into the rosette block 7.

The die cast rosette block 7 is equipped with through holes 12 (FIG. 2) for mounting the device on a portion of the plate of the vehicle bodywork. The bearing lid 10 is let into the rosette block 7 and is secured, for example, around its periphery by peening. A retaining washer 13 engaging in a groove on the shaft ensures the axial retention of the drive pinion 3.

The eccentric disc 14, securely mounted on the shaft 1 and preferably formed in one piece with it, and having an eccentricity $e$ from the shaft central axis as shown in FIG. 2, journals the toothed ring 16 equipped with external teeth 15, and having its teeth in engagement with the internal teeth 17 (FIG. 2) in the rosette block 7. In the example of embodiment shown, the external set of teeth 15 comprises 34 teeth, while the internal set of teeth 17 comprises 36 teeth.

The known method of operation of the device so far described is as follows: when the shaft 1 and the parts rotationally keyed to it are rotated by means of the hand crank 4, 5 in one or the other direction, the eccentric disc 14 moves the toothed ring 16, which thus rolls with its external teeth 15 on the fixed internal teeth 17. Since the numbers of teeth in the two sets differ by two teeth, the relative position between the toothed ring 16 and the internal set of teeth 17, after one revolution of the shaft 1, is displaced by the amount of two teeth divisions in the circumferential direction. The toothed ring 16 revolves in the opposite direction to that of the shaft 1, but with a much lower angular velocity. It can therefore be seen that the provision of abutments on the toothed ring and the association of fixed abutments must result, after an exactly determined number of revolutions of the shaft 1, in the blocking of the shaft and thus in limiting the number of revolutions, and thus in limiting the distance travelled by the parts driven by means of the pinion 3.

The abutment mens according to the invention, which are mounted on the one hand on the rosette block and on the other hand on the toothed ring, will now be explained in more detail. The locking pin 19, slidably guided in its guiding sleeve 18, is most readily seen from FIGS. 1 and 9 to 11. The guide sleeve 18 is firmly fitted into a corresponding cylindrical passage in the rosette block 7. The annular projection 21 which limits the cylindrical passage 20 inside the guide sleeve 18 guides the region 22 of the locking pin 19 which projects out from the guide sleeve 18. The end of the locking pin 19 which is fitted with the transverse recess 23 is guided in a passage 24 in the rosette block 7. The helical compression spring 25 is inserted into the annular space between the locking pin 19 and the cylindrical passage 20 and bears, on the one hand against the flange 26 mounted on the locking pin 19 and preferably formed in one piece therewith, and on the other hand on the rosette block 7. The passage 24 continues as far as an annular duct 27 concentrically surrounding the shaft 1, into which duct the locking pin 19 extends.

Figure 6:
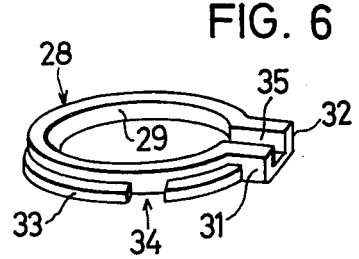
Figure 11:
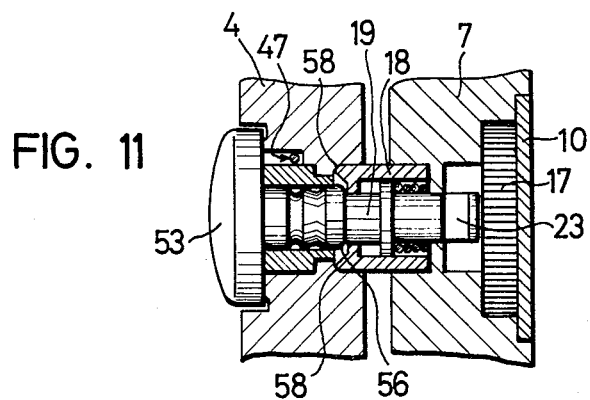

The locking ring 28 is inserted into the annular duct, being journalled rotatably with its internal surface 29 (FIG. 6) on an annular projection 30 of the rosette block 7. The peripheral steps 31 and 32 (FIGS. 2, 6) form the abutment means of the locking ring 28. The annular shoulder 33 of the locking ring 28, which extends between the peripheral steps 31 and 32, is interrupted at 34 to permit passage of the locking pin 19.

Between the two peripheral steps 31 and 32, there is the radial groove 35, which receives the driver pin 36 (FIGS. 2, 3) mounted on the toothed ring 16. As a result of the split-shaped form of the radial groove 35, the driver pin 36 can slide in the radial groove, in order to compensate the eccentricity $e$ as the toothed ring 16 revolves. To secure the locking pin 19 against twist, which must be prevented having regard to the desired engagement of its transverse recess 23 and the annular shoulder 33, it is provided at its inner end with a flattened portion 37 (FIG. 2) facing towards the locking ring 28 and bearing against it in all positions.

FIG. 1 shows that the locking pin 19 and the guide sleeve 18 which journals it are disposed parallel to the shaft 1 in the rosette block 7. The axial distance between the locking pin 19 or its guide sleeve 18 and the shaft 1 equals the axial distance between the catch sleeve 38, inserted into the crank foot 4, and the shaft 1. Axial parallelism therefore also exists between the catch sleeve 38 or the catch bolt 39 journalled by it and the shaft 1. The catch bolt 39 is therefore, in one relative position of the rosette block 7 to the crank foot 4, coaxially aligned with the locking pin 19.

The catch sleeve, steeped down at its inner end, is inserted into a corresponding stepped passage through the crank foot 4 and is held there, for example by peening as illustrated at 40. The inner step 41 of the catch sleeve 38 ends, at its end face, in an annular groove 42 of the crank foot 4 concentrically surrounding the shaft 1. The end face of the guide sleeve 18 bears against the base of the annular groove 42, when the crank foot 4 is pushed with its splining (not shown) coaxially onto the splined head 2 of the shaft 1 and is secured thereby means of a screw 43 having its head countersunk into the crank foot 4.

Figure 7:
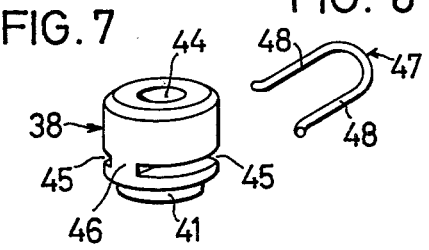
Figure 8:
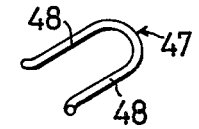

The central cylindrical passage 44 (FIG. 7) in the catch sleeve 38 is so dimensioned that it guides the catch bolt 39 without play but easily slidable. The catch sleeve 38 possesses cuts 45 extending transversely to the cylindrical passage 44, which are cut in sufficiently far for the web 46 remaining between them to be of smaller width than the diameter of the cylindrical passage 44. In this way, the spring constructed as a clip spring 47 (FIG. 8) can partially penetrate with its arms 48 into the cylindrical passage 44, when the clip spring 47 is introduced into the cuts 45 of the catch sleeve 38. The two arrestor recesses 49 and 50 of the catch bolt 39, formed as peripheral grooves, co-operate with the clip spring 47 in such a way that the catch bolt can be slid between two positions.

Figure 9:
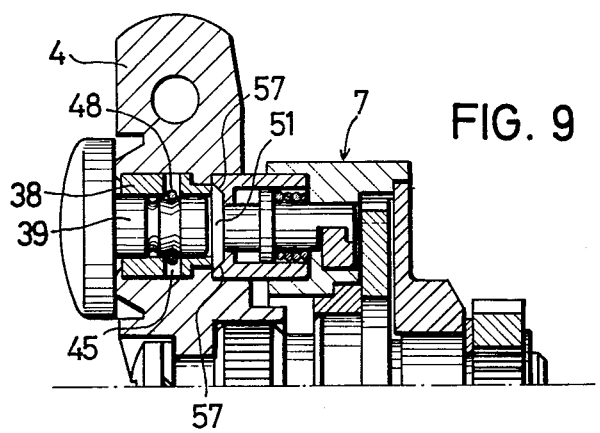
Figure 10:
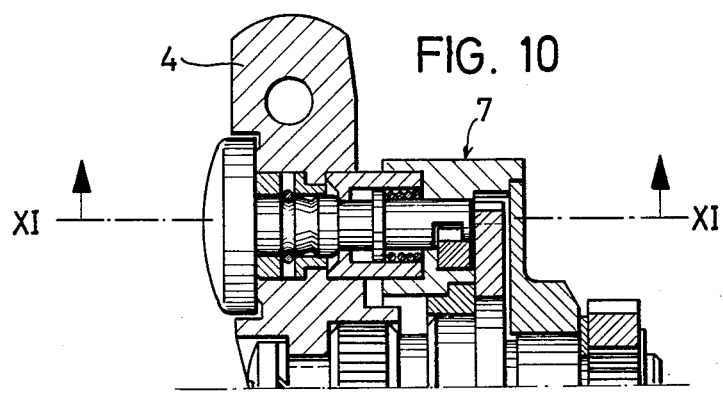
Figure 12:
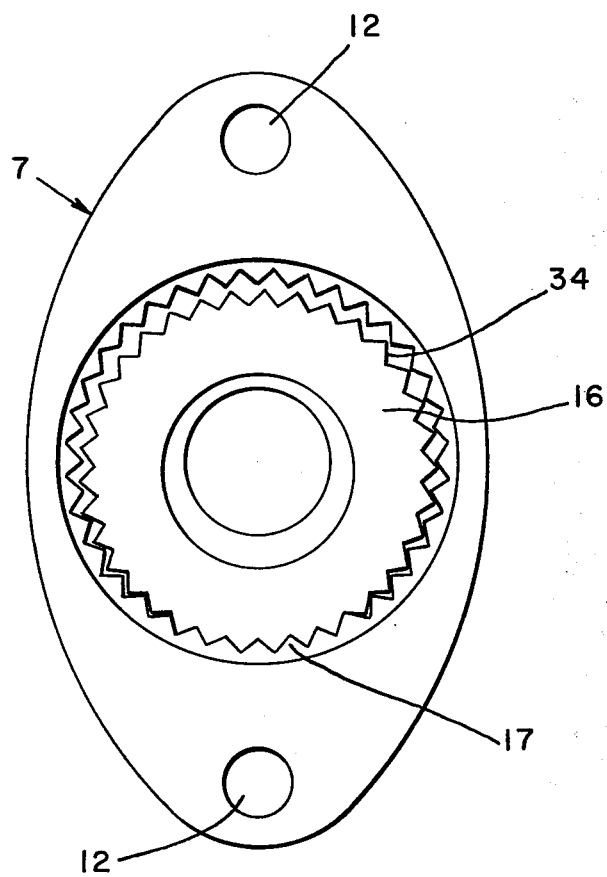
FIG. 12. A view showing the toothed ring in its installed position in the rosette body or housing of the device of this invention.

In the rest position of the catch bolt 39 illustrated in FIGS. 1 and 9, the arms 48 of the clip spring 47 rest in the arrestor recess 50, whereas in the pushed-in position of the catch bolt (FIGS. 10, 11), in which the catch bolt engages into a conical depression 51 of the guide sleeve 18, the clip spring 47 engages with its arms 48 into the arrestor recess 49. As can be seen from FIG. 1 and FIGS. 9 to 11, the arrestor recess 50 possesses in the direction towards the arrestor recess 49 a rather conically widening transition, which facilitates pushing on of the catch bolt 39 into the crank foot 4. In the example shown (FIG. 1) a circular plate 52 is coaxially secured to the outer end of the catch bolt 39, an undercut, pot-shaped actuating button 53 of plastics being pushed over this circular plate. The edge 54 of the actuating button 53 which faces towards the crank foot 4 is received, when the catch bolt 39 is pushed in, in a corresponding annular groove 55 of the crank foot 4.

The method of operation of the device according to the invention is explained below with reference to the preferred application to automobile sliding roofs with sliding and outward lifting functions for the roof flap. In FIG. 1, the locking pin 19 is in its zero position. In this position, the sliding roof is closed, that is the sliding roof is situated in the plane of the roof and completely closes the roof opening. If, starting from this position, the sliding roof is to be lifted out in the manner of a flap by lifting its rear edge and tilting about its front pivot bearing, then the blocking of rotation illustrated in FIG. 1, in which the locking pin 19 engages with its region 22 into the catch sleeve 38 and rotation of the crank 4, 5 is prevented, is released by pressing-in the actuating button 53. When this happens, the clip spring 47 moves out of the arrestor recess 50 and into the arrestor recess 49. The depth of cut of the arrestor recess 49 and the spring force of the clip spring 47 are such that the catch bolt 39 remains in its pressed-in position, against the resistance of the helical compression spring 25 compressed when it is pressed in. When the catch bolt 39 is pressed in, the locking pin 19 is pushed into the rosette block 7 until it adopts the position shown in FIGS. 10 and 11. In this position, its region 22 on the one hand has left the catch bolt 38, while on the other hand its transverse recess 23 is in a position which permits engagement with the annular shoulder 33 of the locking ring 28. As in its zero position, the locking pin 19, in this position also, is still in the interrupted portion 34 of the annular shoulder 33.

The operating crank 4, 5 can now be rotated for the purpose of actuating the sliding roof drive, for example clockwise to produce the desired outward lifting movement of the sliding roof. After a very small angle of rotation, the annular shoulder 33 engages in the transverse recess 23, causing the locking pin 19 to be held in its engaged position. During this initial phase of rotation, the catch bolt 39, which is still pressed in, moves inside the recess 51 of the guide sleeve 18 until it comes into contact at its preferably rounded or chamfered end surface arris 56 with the conically widening oblique disengaging surface 57 of the recess 51. As rotation of the operating crank is continued, the oblique disengaging surface 57 displaces the catch bolt 39 sufficiently far for the clip spring 47 to jump out of its arrestor recess 49 and into the arrestor recess 50; in consequence of the conical form of this arrestor recess 50, the spring displaces the catch bolt 39 completely into its end rest position as shown in FIG. 9.

When rotation of the operating crank is continued clockwise, the toothed ring 16 which is rotated anti-clockwise by means of the eccentric disc 14, transports the circumferential step 31 of the locking ring 28, under the action of the driver pin 36 of the toothed wheel and the radial groove 35, until this circumferential step abuts against the locking pin 19 which projects into the movement path of the peripheral step 31. In this position of the abutment means, the sliding roof, driven by the pinion 3 in conjunction with the driving cables (not shown), has reached its maximum outward lifted position. The rotational drive can of course be stopped earlier, before the abutment means contact one another, so that any intermediate setting is possible.

If the sliding roof is now to be swung in again into its closed position, then the reverse sequence of motion is carried out. To do this, the operating crank 4, 5 is rotated counter-clockwise until the locking ring 28 has been transported by the toothed ring 16 sufficiently far for the annular shoulder 33 with its interruption 34 to release the locking pin 19. The locking pin 19, because of the force of the helical compression spring 25 biasing it, is now driven out of the rosette block 7 and, by the entry of its region 22 into the catch sleeve 38, again blocks the operating crank 4, 5.

If the closed sliding roof panel is now to be displaced towards the rear, fixed edge of the vehicle roof in order to open the roof opening, then the actuating button 53 should again be pressed in to release the blocking of rotation, whereupon the crank 4, 5 can be rotated counter-clockwise. The locking ring 28 is now transported in a direction of rotation which leads to an approach between its peripheral step 32 and the fixed locking pin 19. When the peripheral step 32 contacts the locking pin 19, the opening displacement of the sliding roof is completed. Again, the opening displacement can of course be terminated earlier, by means of parts connected to the sliding roof contacting fixed abutment surfaces. It is of course also possible to fit adjustable peripheral steps onto the locking ring 28, so that, by using one and the same drive device, different forms of roof construction involving sliding motions and/or lifting out angles of different magnitudes can be served.

To close the sliding roof again, the operating crank 4, 5 is again rotated clockwise until the annular shoulder 33 releases the locking pin 19 at 34, so that this pin once again returns into its zero setting which blocks rotation of the crank. If the actuating knob 53 is accidentally or intentionally pushed in out of its rest setting while the roof is being pivoted out or slid, then the oblique ejector surfaces 58 of the guide sleeve 18 shown in FIG. 11 ensure that the catch bolt 39 is again pushed back into its rest position. Faulty operation of the actuating knob 53 therefore cannot adversely affect the desired sequence of motion.

In FIG. 2, the innermost dot-and-dash circle indicates the position of the eccentric disc 14 relative to the shaft 1 and to the circular elements of the rosette block 7 concentric thereto. The rib 59, also shown in FIG. 2, prevents rotation of the bearing ring 11, which is fitted with a recess corresponding to this rib.

What is claimed is:

1. A device for limiting the number of revolutions of a shaft or the like, especially for rotatable drives for sliding roofs of automobiles, comprising a rotatable shaft, an eccentric disc fixedly carried on the shaft for rotation therewith, an externally-toothed ring rotatably journalled on the circumferential surface of the disc and adapted for counter-rotation relative to the shaft by means of a fixed tooth arrangement surrounding the ring and concentric with the shaft axis, the fixed teeth projecting toward the external teeth of the ring for operational engagement therewith when the shaft is caused to rotate, shaft control means operatively engaging the ring for halting shaft rotation after a predetermined number of revolutions including a locking pin mounted adjacent the ring and disposed for manual movement when the ring is in a specific disposition between engaged and disengaged positions, the locking pin being adapted to permit rotation of the ring and thus the shaft in both rotational directions when in its engaged position and to completely halt rotation of the ring and the shaft when in its disengaged position.

2. The device of claim 1 wherein the shaft control means includes a locking ring rotatably journalled concentrically to the shaft and having a radial groove and an annular shoulder portion, the toothed ring having a projecting portion which engages in the radial groove, the annular shoulder portion having an interruption therealong to permit passage of the locking pin, and the locking pin having a transverse recess for engagement with the annular shoulder portion.

3. The device of claim 1 wherein the tooth root radius of the external teeth of the toothed ring exceeds, by approximately the eccentricity of the eccentric disc, the tooth tip radius of the toothed ring.

4. The device of claim 1 further comprising a housing supporting the shaft, a hand crank keyed to an end of the shaft outwardly from the housing to permit manual rotation of the shaft, a guide sleeve in the housing at a position laterally adjacent the shaft and slidably supporting the locking pin therein, means limiting the extent of sliding movement of the locking pin through the guide sleeve in both directions, the locking pin being adapted to engage the hand crank when its transverse recess is disengaged from the annular shoulder portion of the locking ring and to disengage the hand crank when its transverse recess is engaged with the annular shoulder portion.

5. The device of claim 4 including means associated with the locking pin tending to bias the locking pin toward engagement with the hand crank.

6. The device of claim 4 wherein the hand crank is provided with a catch bolt for engaging the locking pin and causing it to slide to disengage it from the hand crank and thereby free the hand crank to enable rotation of the shaft.

7. The device of claim 6 wherein the catch bolt means is adapted to temporarily hold a first position out of engagement with the locking pin and a second position in engagement with the locking pin, and further including means on the hand crank for causing the catch bolt means to retract to the first position from the second position as a function of manually turning the hand crank to rotate the shaft.

* * * * *